United States Patent
Strong

(10) Patent No.: US 9,602,859 B2
(45) Date of Patent: *Mar. 21, 2017

(54) APPARATUS, SYSTEMS AND METHODS FOR SHARED VIEWING EXPERIENCE USING HEAD MOUNTED DISPLAYS

(71) Applicant: EchoStar Technologies L.L.C., Englewood, CO (US)

(72) Inventor: Stephen Strong, Dunwoody, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,198

(22) Filed: Jan. 28, 2016

(65) Prior Publication Data

US 2016/0150267 A1 May 26, 2016

Related U.S. Application Data

(63) Continuation of application No. 14/484,960, filed on Sep. 12, 2014, now Pat. No. 9,253,509, which is a
(Continued)

(51) Int. Cl.
*H04N 21/43* (2011.01)
*H04N 13/04* (2006.01)
(Continued)

(52) U.S. Cl.
CPC ......... *H04N 21/4307* (2013.01); *G01C 19/38* (2013.01); *G01C 21/165* (2013.01); *G02B 27/017* (2013.01); *G06T 7/97* (2017.01); *G06T 15/20* (2013.01); *H04L 65/4084* (2013.01);
*H04L 67/12* (2013.01); *H04N 13/0014* (2013.01); *H04N 13/044* (2013.01); *H04N 13/047* (2013.01); *H04N 13/0468* (2013.01); *H04N 19/597* (2014.11); *H04N 21/21805* (2013.01); *H04N 21/41407* (2013.01); *H04N 21/42202* (2013.01); *H04N 21/42204* (2013.01); *H04N 21/436* (2013.01);
(Continued)

(58) Field of Classification Search
CPC ............ H04N 13/044; H04N 13/0497; H04N 13/0059; G02B 27/017; G02B 27/0172
See application file for complete search history.

(56) References Cited

U.S. PATENT DOCUMENTS

2002/0044152 A1* 4/2002 Abbott et al. ................ 345/629
2006/0284791 A1* 12/2006 Chen et al. ...................... 345/8
(Continued)

*Primary Examiner* — Nam Pham
(74) *Attorney, Agent, or Firm* — Lowe Graham Jones PLLC

(57) ABSTRACT

Systems and methods are operable to share a viewing experience of a free viewpoint format media content event. An exemplary embodiment receives the free viewpoint format media content event, receives unique geometric orientation information from each one of a plurality of head mounted displays (HMDs), determines a unique viewpoint location for each one of the plurality of HMDs based upon the geometric orientation information received from each one of the plurality of HMDs, determines a unique viewpoint area for each one of the plurality of HMDs based upon the determined unique viewpoint location, and communicates each one of the unique viewpoint areas to the associated one of the plurality of HMDs.

20 Claims, 3 Drawing Sheets

Related U.S. Application Data continuation of application No. 13/094,621, filed on Apr. 26, 2011, now Pat. No. 8,836,771.

(51) Int. Cl.

| | |
|---|---|
| *G01C 21/16* | (2006.01) |
| *H04N 21/218* | (2011.01) |
| *H04N 21/422* | (2011.01) |
| *H04N 21/4788* | (2011.01) |
| *G06T 15/20* | (2011.01) |
| *H04L 29/08* | (2006.01) |
| *G01C 19/38* | (2006.01) |
| *H04L 29/06* | (2006.01) |
| *H04N 13/00* | (2006.01) |
| *H04N 19/597* | (2014.01) |
| *H04N 21/436* | (2011.01) |
| *H04N 21/472* | (2011.01) |
| *H04N 21/6587* | (2011.01) |
| *H04N 21/414* | (2011.01) |
| *H04N 21/4363* | (2011.01) |
| *G02B 27/01* | (2006.01) |

(52) U.S. Cl.
CPC ..... *H04N 21/4363* (2013.01); *H04N 21/4788* (2013.01); *H04N 21/47217* (2013.01); *H04N 21/6587* (2013.01); *G02B 2027/014* (2013.01); *G02B 2027/0178* (2013.01); *G02B 2027/0187* (2013.01); *H04N 13/0429* (2013.01)

(56) References Cited

U.S. PATENT DOCUMENTS

| | | | |
|---|---|---|---|
| 2009/0033588 A1* | 2/2009 | Kajita et al. | 345/2.3 |
| 2010/0079356 A1* | 4/2010 | Hoellwarth | 345/8 |
| 2010/0277485 A1* | 11/2010 | Zalewski | 345/502 |
| 2011/0194029 A1* | 8/2011 | Herrmann et al. | 348/569 |
| 2012/0154557 A1* | 6/2012 | Perez et al. | 348/53 |

\* cited by examiner

APPARATUS, SYSTEMS AND METHODS FOR SHARED VIEWING EXPERIENCE USING HEAD MOUNTED DISPLAYS

PRIORITY CLAIM

This patent application is a Continuation of U.S. Non-Provisional patent application Ser. No. 14/484,960, filed Sep. 12, 2014, published as U.S. Publication No. 2015/0007225, entitled "APPARATUS, SYSTEMS AND METHODS FOR SHARED VIEWING EXPERIENCE USING HEAD MOUNTED DISPLAYS," which is a Continuation of U.S. Non-Provisional patent application Ser. No. 13/094,621, filed Apr. 26, 2011, published as U.S. Publication No. 2012/0274750, entitled "APPARATUS, SYSTEMS AND METHODS FOR SHARED VIEWING EXPERIENCE USING HEAD MOUNTED DISPLAYS," and issued as U.S. Pat. No. 8,836,771 on Sep. 16, 2014, the content of which are incorporated herewith in their entirety.

BACKGROUND

Head mounted display (HMD) devices, also known as helmet mounted display devices or video eyewear devices, are display devices worn on the head of a viewer. The HMD is a display device that has small optic displays that are positioned in front of one eye of the viewer (monocular HMD) or each eye of the viewer (binocular HMD). Other HMDs have one relatively large optic display positioned over both of the viewer's eyes. Some HMD optic displays may be configured to present three dimensional (3-D) images.

Some HMDs include head position and head geometric orientation detection systems that are configured to detect movement of the viewer's head. Changes in the position and/or geometric orientation of the viewer's head are sensed by a plurality of accelerometers and/or gyroscopes mounted on, or fabricated into, the HMD. Microelectromechanical systems (MEMS) devices may be used to provide relatively small yet accurate accelerometers and gyroscopes that are mounted to or mounted within the HMD.

With some types of media content, a relatively large potential viewing field may be provided to the HMD. The relatively large viewing field is much larger than the available size of the viewing area provided by the HMD optic displays. Based on an identified viewpoint location, a portion of the relatively large viewing field is selected for presentation on the HMD optic display. An exemplary media content stream with a relatively large potential viewing field may be streamed to the HMD under a multi-view coding format.

As the viewer moves their head, the accelerometers and gyroscopes sense the movement of the viewer's head. An onboard processing system then determines the geometric orientation and/or position of the viewer's head based upon the detected movement of the viewer's head. A change in the viewpoint location is then determined based on the detected movement. The field of view of the presented images by the HMD is then varied based upon the determined change of the viewpoint location.

However, such viewing experiences are limited to a single viewer. Accordingly, there is a need in the arts to enable multiple viewers to share an experience while viewing a single presented media content event.

SUMMARY

Systems and methods of sharing a viewing experience of a free viewpoint format media content event are disclosed. An exemplary embodiment receives the free viewpoint format media content event, receives unique geometric orientation information from each one of a plurality of head mounted displays (HMDs), determines a unique viewpoint location for each one of the plurality of HMDs based upon the geometric orientation information received from each one of the plurality of HMDs, determines a unique viewpoint area for each one of the plurality of HMDs based upon the determined unique viewpoint location, and communicates each one of the unique viewpoint areas to the associated one of the plurality of HMDs.

BRIEF DESCRIPTION OF THE DRAWINGS

Preferred and alternative embodiments are described in detail below with reference to the following drawings.

DETAILED DESCRIPTION

Figure 1:
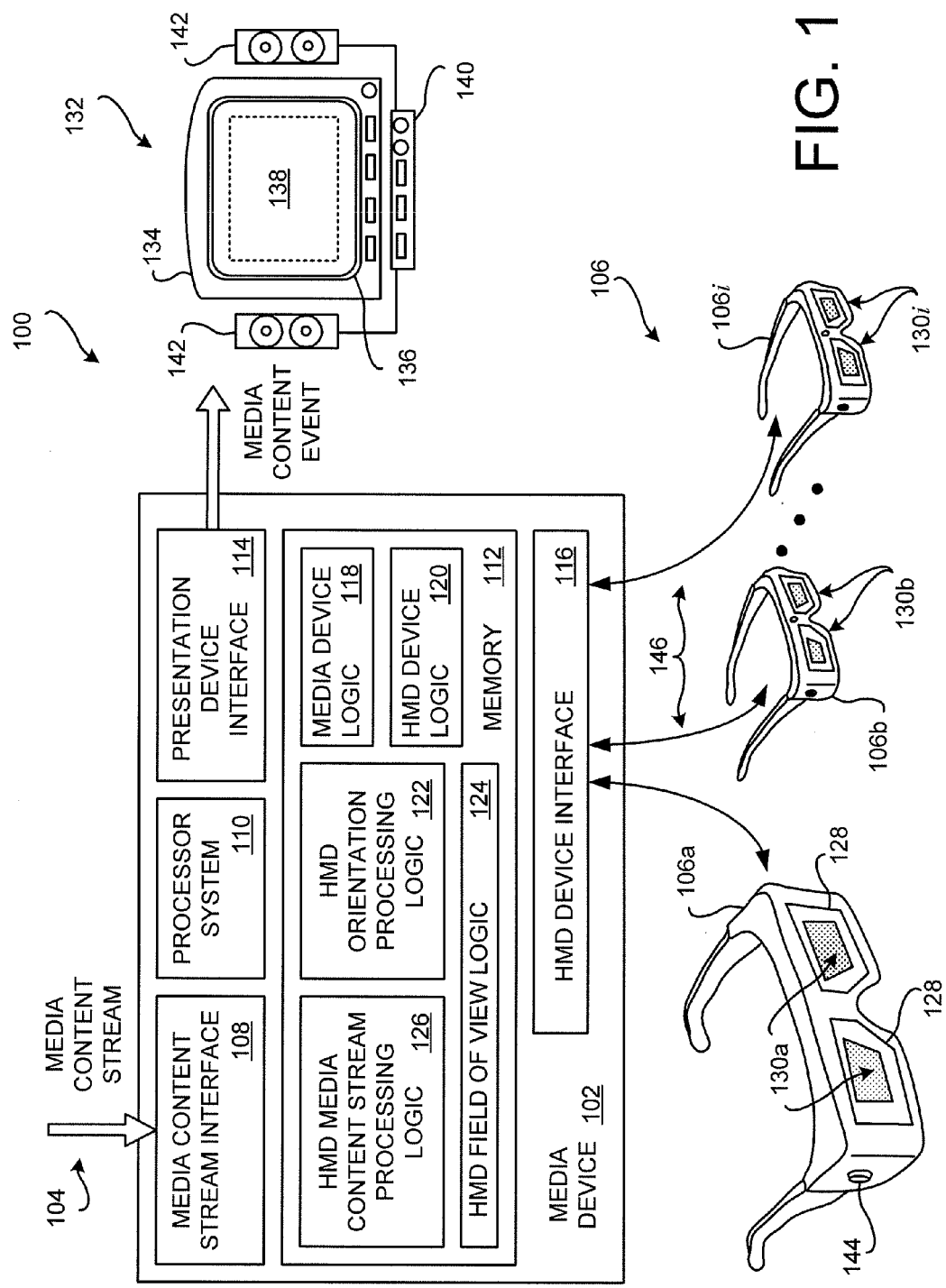
FIG. 1 is a block diagram of an embodiment of a multiple head mounted display (HMD) presentation system implemented in a media device.

FIG. 1 is a block diagram of an embodiment of a multiple head mounted display (HMD) presentation system 100 implemented in a media device 102. Embodiments of the multiple HMD presentation system 100 are configured to facilitate a shared viewing experience of the media content event received in the media content stream 104. The media content event is uniquely presented to each of the plurality of head mounted displays (HMDs) 106 communicatively coupled to the media device 102. Examples of the media device 102 include, but are limited to, a set top box (STB), a television (TV), a digital video disc (DVD) player, a digital video recorder (DVR), a game playing device, or a personal computer (PC).

The non-limiting exemplary media device 102 comprises a media content stream interface 108, a processor system 110, a memory 112, and an optional presentation device interface 114, and an HMD interface 116. The memory 112 comprises portions for storing the media device logic 118, the HMD device logic 120, the HMD geometric orientation logic 122, the HMD field of view logic 124, and the HMD media content stream processing logic 126. In some embodiments, one or more of the logic 118, 120, 122, 124 and/or 126 may be integrated together, and/or may be integrated with other logic. In other embodiments, some or all of these memory and other data manipulation functions may be provided by and using remote server or other electronic devices suitably connected via the Internet or otherwise to a client device. Other media devices 102 may include some, or may omit some, of the above-described media processing components. Further, additional components not described herein may be included in alternative embodiments.

Each of the HMD devices 106, also known as helmet mounted display devices or video eyewear devices, are display devices worn on the head of a viewer. The HMDs 106 have one or more small optic displays 128 that are positioned in front of the eyes of the viewer. Some HMDs 106 may be configured to present three dimensional (3-D) images.

The presented media content event is provided using a suitable free viewpoint format. The relatively large viewing field of the free viewpoint format media content event is much larger than the available size of the viewing area provided by the HMD optic display 128. Based on an identified viewpoint location, a viewpoint area 130 corresponding to a portion of the relatively large viewing field is selected for presentation on the optical display 128 of the HMD 106.

As each one of the users of the plurality of HMDs 106 moves their head, the accelerometers and gyroscopes sense the movement of the viewer's head. Based on the determined change in the geometric orientation and/or position of the HMD 106, a change in the viewpoint location is then determined based on geometric orientation information communicated from the HMD 106 to the media device 102. The viewpoint area 130 is then varied based upon the determined change of the viewpoint location.

Accordingly, each particular user of their HMD 106 is able to individually control their viewpoint area 130 that is presented on their HMD 102. For example, the user of the HMD 106a may be viewing a viewpoint area 130a that corresponds to a particular portion of interest of the viewable area of the free viewpoint format media content event. Alternatively, the user of the HMD 106b may be viewing a viewpoint area 130b that corresponds to a different portion of interest of the viewable area of the same free viewpoint format media content event.

In contrast, a non-free viewpoint media content format presents a single viewpoint that corresponds to the selected camera angle of the media content event. The single-view format is similar to the viewpoint presented in a traditional media content event, such as a movie or the like that is presentable on a media presentation system 132. An exemplary media presentation system 132 may comprise a video display device 134 that includes a display 136 that presents a single viewpoint video image 138 corresponding to the video portion of the presented media content event. The audio portion may be presented by an audio presentation device 140 that reproduces the audio portion of the presented media content event on one or more speakers 142. Non-limiting examples of the video display device 134 include televisions, monitors, computers, or the like. Non-limiting examples of the audio presentation device 140 include stereos, surround-sound systems, or the like. In some embodiments, the video display device 134 and the audio presentation device 140 are integrated into a single media presentation device.

In an exemplary embodiment, a person directly viewing the display 136 of the video display device 134 would experience the presentation of the media content event in a traditional single-view format. However, all individuals in the vicinity of the media presentation system 134 would hear the audio portion of the commonly presented free viewpoint format media content event. Some HMDs 106 may include their own speakers or the like so as to present the audio portion of the commonly presented media content event to the particular user of that HMD 106. Since the plurality of users of the HMDs 106 are each viewing their own unique viewpoint area 130, and are concurrently hearing the same audio portion of the commonly presented free viewpoint format media content event, the users of the plurality of HMDs 106 are having a shared viewing experience.

The commonly presented media content event in the media content stream 104 may be provided to the media device 102 using any suitable free viewpoint media content format. For example, but not limited to, the multiview video coding (MVC) format is an exemplary free viewpoint media content format.

Determination of the presented viewpoint area 130 is based on the relative geometric orientation of the particular HMD 106 in three dimensional (3-D) space. The geometric orientation may be based on any suitable coordinate reference system. The geometric orientation information may be based on angles, vectors, or the like. For example, but not limited to, the geometric orientation information may be expressed in terms of Euler angles, Tait-Bryan angles (yaw, pitch and roll), or the like. The geometric orientation information may be relative to the current location of the particular HMD 106, or may be referenced to a predefined location or point.

Based on the current geometric orientation of the HMD 106, a current viewpoint location is determined. Based on the determined current viewpoint location, the viewpoint area 130 is then determined. The viewpoint area 130 corresponds to the available viewable area of the optic displays 128 of the HMD 106. The viewpoint area 130 is then presented on the optic displays 128 of that particular HMD 106. For example, if the geometric orientation of the HMD 106 is at a straight forward geometric orientation, then the viewpoint area 130 will correspond to a portion of the viewable area of the free viewpoint format media content event that is straight ahead view.

Geometric orientation of the HMD 106 in 3-D space is determined by a geometric orientation system 144 residing on or within each HMD 106. The geometric orientation system 144 may comprise a plurality of accelerometers and/or a plurality of gyroscopes that are configured to detect movement of the HMD 106. For example, but not limited to, the HMD 106 may include microelectromechanical systems (MEMS) accelerometers and/or gyroscopes. In some embodiments, the geometric orientation system 144 may be based on detectable markers on the surface of the HMD 106 that is detected by an external system which is configured to determine the geometric orientation of the HMD 106. Any suitable geometric orientation determination system may be used by the various embodiments of the HMDs 106.

Based on the detected movement of the HMD 106, the current viewpoint location is determined. The determined current viewpoint location corresponds to a point of interest within the relatively large potential viewing field that the user is interested in looking at. Accordingly, the user may change the presented viewpoint area 130 in a panning and/or tilting manner by moving their head, which corresponds to the sensed movement of the HMD 106 being worn by that user.

An exemplary viewing experience is described to facilitate a conceptual understanding of operation of an embodiment of the multiple HMD presentation system 100. Assume that a plurality of users of the HMDs 106 are commonly viewing a free viewpoint format media content event pertaining to an action film, where the subject matter pertains to predatory aliens hunting humans in a dense jungle. In a particular scene, the current viewpoint of the relatively large potential viewing field may generally correspond to one or more of the human actors walking along a narrow trail through the jungle.

The relatively large potential viewing field of the free viewpoint format media content event would provide a potentially large and wide viewing area, such as a 360 degree view all around the human actor. The user is able to select a particular viewpoint area 130 of interest from the relatively large potential viewing field of the relatively large potential viewing field media content event. The presented viewpoint area 130 is determined by the current geometric orientation of their particular HMD 106, which is generally pointed towards a viewpoint of interest. The geometric orientation system 144 of that HMD 106 determines the geometric orientation of the HMD on a real time basis, or near real time basis, based on detected movement of the user's head.

For example, the user of the HMD 106a may be watching where the human actor is walking, and thus, their presented viewpoint area 130a may correspond to a forward-looking view of the jungle trail (since the user's head would be oriented in a forward-looking geometric orientation as determinable from geometric orientation information provided by the geometric orientation system 144 of the HMD 106a). However, at the same time, the user of the HMD 106b may be watching the ground over which the human actor is traversing, and thus, their presented viewpoint area 130a may correspond to a downward-looking view of ground of the jungle trail (since the user's head would be oriented in a downward-looking geometric orientation as determinable from geometric orientation information provided by the geometric orientation system 144 of the HMD 106b). Concurrently, the user of the HMD 106i may be looking upward and to the left, and thus, their presented viewpoint area 130i may correspond to a upward-looking view of the tree canopy along the jungle trail (since the user's head would be oriented in an upward-looking geometric orientation as determinable from geometric orientation information provided by the geometric orientation system 144 of the HMD 106i).

All users are listening to the presented audio portion of the commonly presented media content event. Further, each of the users may hear anything another user says.

Continuing with the description of the exemplary viewing experience, suppose that the predatory alien is viewable up in the tree canopy, and that the user of the HMD 106i sees the predatory alien in the tree canopy. The user of the HMD 106i may then shout "I see the predatory alien up in the trees to the left!" The other users hear the voice of the user of the HMD 106i, and subsequently turn their heads upward and to the left. The geometric orientation systems 144 detect the movement of their particular HMD 106, and accordingly, the viewpoint area 130 is re-computed to show a panning change of the presented viewpoint area 130 from their current viewpoint location up to a new viewpoint location that corresponds to the upwards view of the predatory alien in the tree canopy. Accordingly, all users are then able to commonly share the viewing experience of the predatory alien as it leaps downward from the tree canopy to attack the humans.

Operation of an exemplary multiple HMD presentation system 100 is generally described herein below. The media content stream interface 108 is configured to receive the media content stream 104 having the media content event (that is provided in the free viewpoint media content event). The processor system 110, executing the media device logic 118, processes the received media content stream 104 to obtain video information corresponding to the relatively large potential viewing field of the free viewpoint format media content event.

In embodiments that are communicatively coupled to the media presentation system 132, a single viewpoint video image may be derived from the media content event by the processor system 110. The single viewpoint video image may then be optionally communicated to the video display device 134, via the presentation device interface 114, for presentation on the display 136.

The processor system 110 also obtains the audio portion of the media content event. The audio portion may be communicated to the audio presentation device 140, via the presentation device interface 114. The audio presentation device reproduces the audio portion of the presented media content event on one or more speakers 142. Alternatively, or additionally, the audio portion may be communicated to and reproduced by the video display device 134 and/or to individual HMDs 106. Accordingly, each of the users of the HMDs 106 share the experience of hearing the audio portion of the commonly presented media content event.

The processor system 110, executing the HMD device logic 120, determines the particular type of HMD 106 that it is communicatively coupled to via the HMD device interface 116. The HMDs 106 may be different from each other, and accordingly, video image data corresponding to the determined viewpoint area 130 may be determined for each particular HMD 106.

In the various embodiments, a database of technical specifications pertaining to the various types of available HMDs 106 may be stored as part of the HMD device logic 120, or may be stored elsewhere in a suitable data base in memory 112 or another memory medium. Additionally, or alternatively, an HMD 106 may download its technical specifications to the media device 102 during an initialization process that is performed when the HMD 106 is initially coupled to the HMD interface 116, and/or when the HMD 106 is initially powered on. The technical specification of each HMD 106 may indicate the required format of the video image data, may specify the format of audio information if presented by speakers of the HMD 106, may specify the size of the viewpoint area 130 (the presentable field of view of the optic displays 128), and/or may specify the nature of the geometric orientation information provided by the geometric orientation system 144.

The HMD geometric orientation logic 122, based on the geometric orientation information provided by the geometric orientation system 144 of each HMD 106, is configured to determine in real time, or in near-real time, the geometric orientation of each HMD 106 in 3-D space. In an exemplary embodiment, raw movement data detected by the various components of the geometric orientation system 144 (e.g., the movement detected by the accelerometers and/or gyroscopes) is communicated to the media device 102. The received raw movement data is processed by the HMD geometric orientation logic 122 to determine the geometric orientation of the HMD 106 in 3-D space. Alternatively, or additionally, the HMD 106 may include a processing system (not shown) that is configured to determine its respective current geometric orientation in 3-D space. The HMD-determined geometric orientation information may then be communicated to the media device 102.

Based on the current determined current geometric orientation of each HMD 106, the current viewpoint location within the viewable area of the media content event for each HMD 106 is determined. The current viewpoint location is used to determine a unique viewpoint area 130 for each HMD 106. The viewpoint area 130 may be determined under the management of the HMD field of view logic 124 in an exemplary embodiment. As the geometric orientation of each HMD 106 changes, the current viewpoint location within the viewable area of the media content is changed. A new current viewpoint area 130 is determined as the viewpoint location of the HMD changes as updated geometric orientation information is being received from each of the HMDs 106.

Based on the determined current viewpoint area 130, video image data is then determined for each of the HMDs 106. The video image data is determined under the management of the HMD media content stream processing logic 126. The video image data for a particular HMD 106 is based upon current viewpoint area 130. Further, the video image data is based on a variety of other factors.

For example, the determined video image data is based on the technical specification of each HMD 106. For example, HMDs 106 may have different presentable viewing areas on their particular optic displays 128. Since presentable viewing areas of the optic displays 128 may vary between different types of HMDs 106, the video image data determined for each viewpoint area 130 may be vary from one HMD 106 to another HMD 106, even if they have the same current geometric orientation in 3-D space. Thus, the video image data is determined in part based on the presentable viewing areas of the particular optic display 128 used by the particular HMD 106.

Further, different HMDs 106 may use different formats for video image data. Accordingly, the HMD media content stream processing logic 126 processes the video image data based on the required video image data format for each particular HMD 106.

The determined video image data for each HMD 106 is then communicated to the destination HMD 106, over a communication link 146 established between the HMD interface 116 and each of the HMDs 106. In an exemplary embodiment, the HMD interface 116 is configured to communicatively couple to one or more of the HMDs 106 using a wire-based connector. Alternatively, the HMD interface 116 may be configured to wirelessly communicate with one or more of the HMDs 106 using a suitable wireless medium, such as an infrared (IR) signal or a radio frequency (RF) signal. In such embodiments, the HMD interface 116 comprise one or more RF transceivers. Some embodiments of the media device 102 are configured to couple to different types of HMDs 106 using different types of communication links 146.

Alternative embodiments may comprise a plurality of distinct processing modules that are each configured to process the received media content stream 104, and/or the free viewpoint format media content event therein, to determine the viewpoint area 130 for a particular HMD 106. Accordingly, each processing module may comprise its own processor system 110, memory 112, and/or HMD interface 116. Each processing module may then manage its own HMD device logic 120, HMD geometric orientation logic 122, HMD field of view logic 124, and/or the HMD media content stream processing logic 126. Some embodiments may share a component or module. For example, the HMD interface 116 may be shared by the plurality of processing modules. Alternatively, or additionally, an embodiment may store one or more of the logic 120, 122, 124 and/or 126 on a commonly shared memory medium and assess such logic on an as needed basis. In some embodiments, the audio portion of the media content event may be commonly processed and then communicated to the plurality of HMDs 106.

Figure 2:
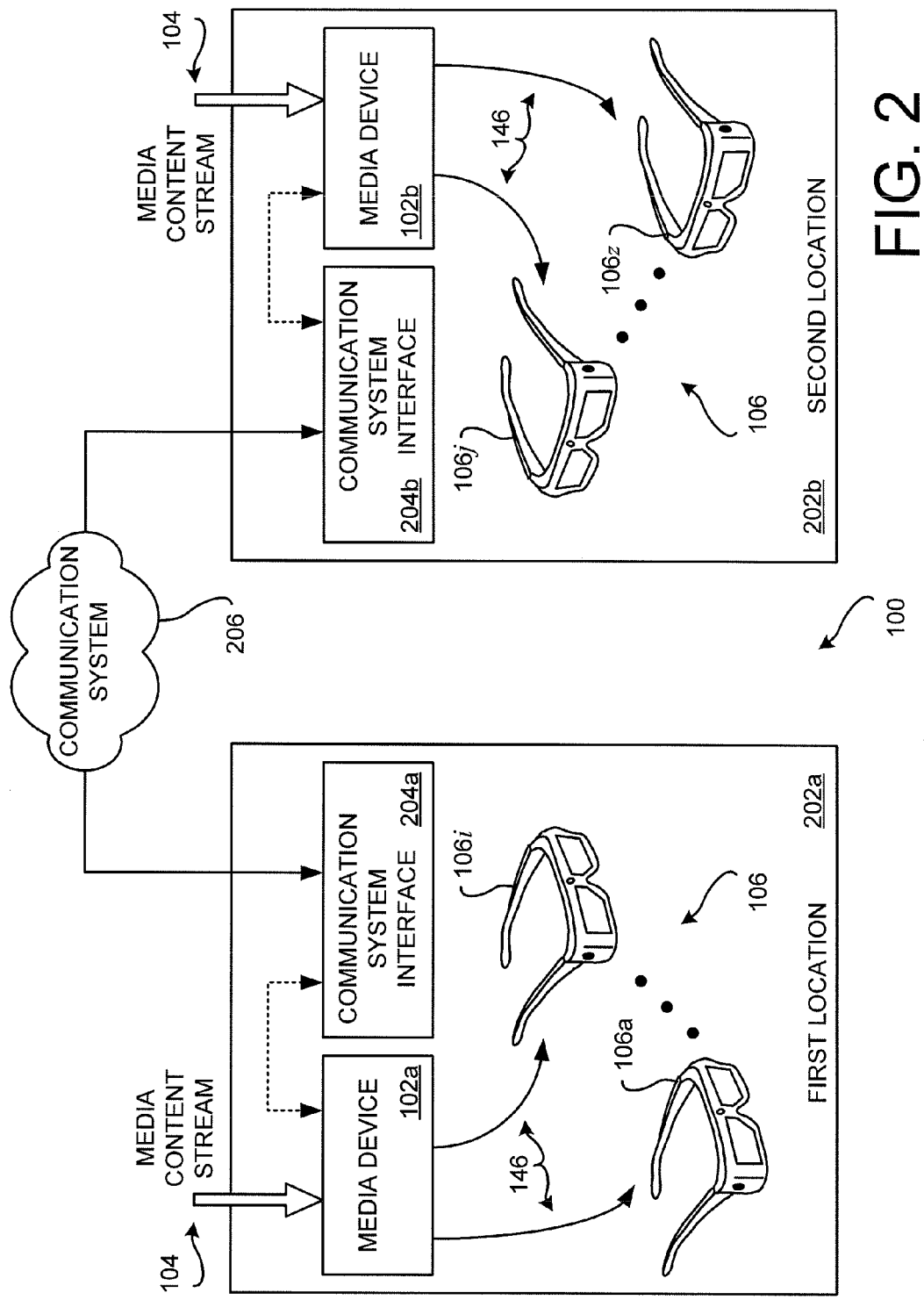
FIG. 2 is a block diagram of an embodiment of a multiple HMD presentation system implemented in media devices at different locations.

FIG. 2 is a block diagram of an embodiment of a multiple HMD presentation system 100 implemented in a plurality of media devices 102*a*, 102*b*. The media devices 102*a*, 102*b* are located at different locations.

The first exemplary media device 102*a* is at a first location 202*a*. The first media device 102*a* is presenting a free viewpoint format media content event from the received media content stream 104. The second media device 102*b* is at a second location 202*b*. The second media device 102*b* is also presenting the same free viewpoint format media content event from the concurrently received media content stream 104. Other media devices 102 at other locations (not shown) may also be concurrently presenting the free viewpoint format media content event. In the various embodiments, the second location 202*b* is different than the first location 202*a*. The locations may be in different rooms, different parts of the same town, different towns, even different countries. Namely, different locations are spatially separated from each other to an extent that user in the second location 202*b* are not able to hear the presentation of the audio portion that is being presented in the first location 202*a*.

The first media device 102*a* is providing each of the plurality of HMDs 106*a* through HMD 106*i* a particular viewpoint area 130 that is determined based upon the current geometric orientation of that particular HMD 106. The second media device 102*b* is also providing each of the plurality of HMDs 106*j* through HMD 106*z* a particular viewpoint area 130 that is determined based upon the current geometric orientation of that particular HMD 106. In some instances, there may be only a single HMD 106 operating at locations 202*a* and/or 202*b*.

In an exemplary embodiment, the first media device 102*a* is in communication with the second media device 204*b* to synchronize presentation of the free viewpoint format media content event. For example, the media content stream 104 may be arriving at the media devices 102*a*, 102*b* at slightly different times. Accordingly, presentation of the free viewpoint format media content events may be advanced or retarded at one or more of the media devices 102*a*, 102*b* to synchronize presentation to the same time.

Communication between the media devices 102*a*, 102*b* is facilitated by the communication system interface 204*a* at the first location 202*a* and the communication system interface 204*b* at the second location 202*b*. The communication system interfaces 204*a*, 204*b* may be separate electronic communication devices. Alternatively, one or more of the communication system interfaces 204*a*, 204*b* may be integrated components of its respective media device 102*a*, 102*b*.

The communication system interfaces 204*a*, 204*b* are communicatively coupled together via a communication system 206. The communication system 206 is illustrated as a generic communication system. In one embodiment, the communication system 206 comprises a radio frequency (RF) wireless system, such as a cellular telephone system. Accordingly, the communication system interfaces 204*a*, 204*b* include a suitable transceiver. Alternatively, the communication system 206 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the communication system interfaces 204*a*, 204*b* may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

Each of the media devices 102a, 102b are concurrently receiving the media content stream 104, and thus, are able to commonly present the video and audio portions of the free viewpoint format media content event to the plurality of HMDs 106 regardless of their location. Accordingly, each user is able commonly hear the audio portion and to uniquely view their own viewpoint area 130 that is determined based upon the current geometric orientation of their HMD 106.

Optionally, some embodiments of the multiple HMD presentation system 100 are configured with the capability of permitting voice exchanges, such as various user's verbal comments made during presentation of the free viewpoint format media content event, between the users at the first location 202a and the users at the second location 202b. For example, a telephone or equivalent link may be established between the locations 202a, 202b so that the users can effectively talk with each other during presentation of the concurrently presented media content event. Any suitable telecommunication system or medium may be used by the various embodiments. In some situations, the communication medium used to support voice communications between the plurality of locations 202a, 202b may be separate and distinct from the embodiments of the media devices 102a, 102b and/or the communication system interfaces 204a, 204b. As long as the media devices 102a, 102b are concurrently receiving the media content stream 104, or are receiving the media content stream 104 at substantially the same time, the users and the locations 202a, 202b will commonly experience a shared presentation of the concurrently presented free viewpoint format media content event.

For example, the media content stream 104 may be received from a media content provider that is broadcasting the free viewpoint format media content event via a broadcast system and/or even the communication system 206. Examples of a broadcast system include, but are not limited to, a satellite system, a cable system, an over-the-air broadcast system, the Internet, or any other suitable system that is configured to support common communication of the free viewpoint format media content event to the separately located media devices 102a, 102b.

In some embodiments, trick play functionality may be commonly enforced between the media devices 102a, 102b. For example, a user at the first location 102a may wish to pause or rewind the concurrently presented free viewpoint format media content event. Accordingly, the trick play function operation changes presentation of the free viewpoint format media content event at the media device 102a. The trick play function operation occurring at the media device 102a may be emulated by the second media device 102b by concurrently communicating the same trick play function commands to the second media device 102b. Accordingly, the trick play function also changes presentation of the free viewpoint format media content event at the media device 102b. For example, but not limited to, if the user at the first location 202a pauses or rewinds the commonly presented media content event, the media device 102b at the second location 202b also pauses or rewinds the concurrently presented media content event in response to the user commands initiated at the first location 202a. The reverse may also be true, where a user at the second location 202b may concurrently control operation of both of the media devices 102a, 102b.

Figure 3:
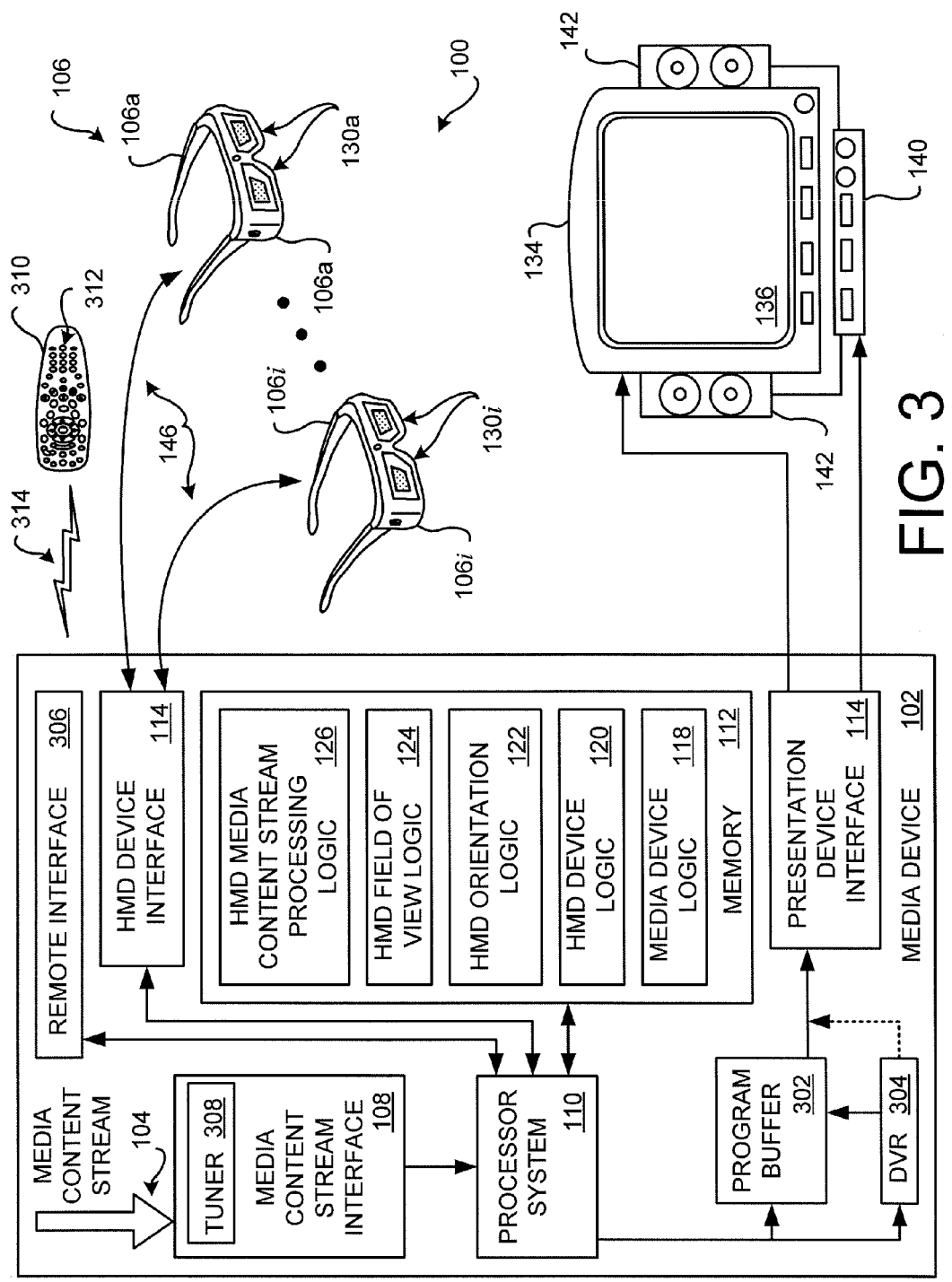
FIG. 3 is a block diagram of an embodiment of a multiple HMD presentation system implemented in a set top box type of media device.

FIG. 3 is a block diagram of an embodiment of a multiple HMD presentation system 100 implemented in a set top box type (STB) of media device 102. The non-limiting exemplary STB type media device 102 comprises a media content stream interface 108, a processor system 110, a memory 112, and an optional presentation device interface 114, an HMD interface 116, a program buffer 302, an optional digital video recorder (DVR) 304, and an optional remote interface 306. The memory 112 comprises portions for storing the media device logic 118, the HMD device logic 120, the HMD geometric orientation logic 122, the HMD field of view logic 124, and the HMD media content stream processing logic 126. In some embodiments, one or more of the logic 118, 120, 122, 124 and/or 126 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the STB type media device 102 is now broadly described. A media content provider provides the free viewpoint format media content event that is received in one or more multiple media content streams 104 that may be multiplexed together in one or more transport channels. The transport channels with the media content streams 104 are communicated to the STB type media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 104 can be received from one or more different sources, such as, but not limited to, a cable system, a radio frequency (RF) communication system, or the Internet.

The one or more media content streams 104 are received by the media content stream interface 108. One or more tuners 308 in the media content stream interface 108 selectively tune to one of the media content streams 104 in accordance with instructions received from the processor system 110. The processor system 110, executing the media device logic 118 and based upon a request for a media content event of interest specified by a user, parses out media content associated with the media content event of interest. If the media content event is a free viewpoint format media content event, then embodiments of the multiple HMD presentation system 100 may compute and then communicate the plurality of different viewpoints 130 to the plurality of HMDs 106. Alternatively, if the media content event is a single viewpoint format media content event, then embodiments of the multiple HMD presentation system 100 present the media content event using the single-view format which is presentable on the media presentation system 132 and/or the HMDs 106. (That is, the HMDs 106 then operate to present the media content event using the single-view format.)

The free viewpoint format media content event of interest is then assembled into a stream of video and/or audio information which may be stored by the program buffer 302 such that the unique viewpoint areas 130 determined from the free viewpoint format media content event can be streamed out to the HMDs 106. Alternatively, or additionally, the parsed out free viewpoint format media content event may be saved into the DVR 304 for later presentation. The DVR 304 may be directly provided in, locally connected to, or remotely connected to, the STB type media device 102.

The exemplary STB type media device 102 is configured to receive commands from a user via a remote control 310. The remote control 310 includes one or more controllers 312. The user, by actuating one or more of the controllers 312, causes the remote control 310 to generate and transmit commands, via a wireless signal 314, to the media device 102. The commands may control the media device 102, the HMDs 106, and/or control the media presentation system 132. The wireless signal 314 may be an infrared signal or an RF signal. For example, one of the users may operate the remote control 310 to pause or rewind the concurrently presented free viewpoint format media content event.

The above processes performed by the STB type media device 102 are generally implemented by the processor system 110 while executing the media device logic 118. Thus, the STB type media device 102 may perform a variety of functions related to the processing and presentation of one or more media content events received in the media content stream 104.

In an alternative embodiment, the media device 102 is a separate electronic device that may coupled to a set top box or other media device configured to receive a broadcast free viewpoint format media content event. The free viewpoint format media content event is received and then processed by the stand-alone embodiment of the media device 102. Such stand-alone embodiments may be used with legacy media devices.

In some embodiments, a selected one of the HMDs 106 is used to define the viewpoint location that is used to determine the single viewpoint video image 138 presented on the display 136 of the video display device 134. As the user moves their head, and thus changes the geometric orientation of their HMD 106, the media device tracks the movement of the HMD 106 and presents a viewpoint area 130 on the display 136. Thus, viewers who are not using one of the HMDs may also experience the shared viewing of the free viewpoint format media content event.

In some embodiments, the single viewpoint video image 138 is determined based upon a viewpoint location within the viewable area of the media content event that the plurality of HMDs are directed towards. For example, if all of the users of the HMDs 106 are looking to the left and upward, the single viewpoint video image 138 is changed so as to also be presenting a view that is generally to the left and upwards. The view point location of the single viewpoint video image 138 may be determined in a variety of manners. One embodiment determines an average viewpoint location based on the individual viewpoint locations of the HMDs 106. Any suitable statistical analysis technique may be used to determine the average viewpoint location for the single viewpoint video image 138 based on the individual viewpoint locations of the HMDs 106. Some embodiments may employ a threshold, wherein those HMDs 106 that are not looking in a direction that a predominant number of other HMDs 106 will be disregarded when the viewpoint location of the single viewpoint video image 138 is determined.

At times, the viewpoint location as determined by the geometric orientation of two or more of the HMDs 106 may be concurrently and may be substantially the same. Some embodiments of the media device 102 may be configured to determine a common viewpoint area 130 that is concurrently communicated to the two or more HMDs 106 that have substantially the same viewpoint location. The viewpoint locations may be identical, or may be within some convergence threshold, such as a predefined area or angle of each other. For example, if the geometric orientation angles of the two or more HMDs 106 are within two or three degrees of each other (the convergence threshold), a common viewpoint area 130 is determined. The common viewpoint area 130 may be acceptable to all of the users. Here, any abrupt change when the unique viewpoint areas 130 transition to the determined common viewpoint area 130 would not be noticeably discernable to the users. When a common viewpoint area 130 is utilized, the embodiments more efficiently utilize the computational capacity of the processor system 110.

Subsequently, when there is a divergence between subsequent viewpoint locations of the two or more HMDs 106 that diverge by an amount greater than a divergence threshold, then unique viewing areas 130 are separately determined and provided to each one of the HMDs 106. Accordingly, embodiments are configured to compare a location of the viewing areas to determine a location difference.

In an exemplary embodiment, the divergence threshold may be the same as the convergence threshold. Alternatively, the divergence threshold may be different from the convergence threshold. For example, the convergence threshold may be slightly greater than the convergence threshold by one or two degrees in the geometric orientation angles of the HMDs 106.

In some embodiments, a change in location of a particular HMD 106 may be detected by the plurality of accelerometers and/or gyroscopes mounted on, or fabricated into, the HMD 106, and/or determined by the media device 102. In such embodiments, the viewpoint location may not change, yet the apparent size of the presented viewpoint area should be adjusted to provide a more realistic experience based on the determined change in location of the HMD 106. For example, if the user of the HMD 106 steps forward, the viewpoint area is decreased to simulate a "zoom in" effect wherein presented objects appear to be closer to the user. Conversely, if the user of the HMD 106 steps backward, the viewpoint area is increased to simulate a "zoom out" effect wherein presented objects appear to be farther from the user.

It should be emphasized that the above-described embodiments of the multiple HMD presentation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A first media device configured to present a streaming free viewpoint format media content event that is viewable on a display associated with a head mounted display (HMD), comprising:
 a first interface configured to receive a media content stream that includes at least the streaming free viewpoint format media content event,
  wherein the streaming free viewpoint format media content event includes a stream of video information and a corresponding stream of audio information, and
  wherein the stream of video information of the streaming free viewpoint format media content event is defined by a field of view that is larger than a single viewpoint viewing field presentable on the display of the HMD;

a processor system communicatively coupled to the first interface and configured to:

receive unique geometric orientation information of the HMD;

define a geometric orientation of the HMD in a three dimensional space based on the unique geometric orientation information; and determine the single viewpoint viewing field from the video portion of the streaming free viewpoint format media content event;

a display interface communicatively coupled the processor system and to the display, wherein the single viewpoint viewing field is received from the processor system and is communicated to the display for presentation to a user, wherein the stream of audio information is synchronously presented with presentation of the single viewpoint viewing field;

a second interface communicatively coupled to the processor system and a second media device via a communication system, wherein presentation of the streaming free viewpoint format media content event is presented by the first media device in synchronism with presentation of the streaming free viewpoint format media content event by the second media device such that a first user of the first media device and a second user of the second media device concurrently view the stream of video information and concurrently hear the stream of audio information of the streaming free viewpoint format media content event.

2. The media device of claim 1, further comprising:

a third interface operable to receive a command initiated by the first user, wherein the command received at the third interface of the first media device operates the first media device to pause presentation of the streaming free viewpoint format media content event, and wherein the first media device causes the second media device to also pause presentation of the streaming free viewpoint format media content event.

3. The media device of claim 1, further comprising:

a third interface operable to receive a command initiated by the first user, wherein the command received at the third interface of the first media device operates the first media device to rewind presentation of the streaming free viewpoint format media content event, and wherein the first media device causes the second media device to also rewind presentation of the streaming free viewpoint format media content event.

4. The media device of claim 1, wherein a first user's verbal comment made by the first user of the first media device is communicated from the first media device to the second media device via the communication system, and wherein the second user of the second media device hears the first user's verbal comment.

5. The media device of claim 1, wherein the processor system of the first media device advances presentation of the streaming free viewpoint format media content event so that the streaming free viewpoint format media content event is synchronously presented by both the first media device and the second media device.

6. The media device of claim 1, wherein the processor system of the first media device retards presentation of the streaming free viewpoint format media content event so that the streaming free viewpoint format media content event is synchronously presented by both the first media device and the second media device.

7. The media device of claim 1, wherein the processor system of the first media device communicates the determined single viewpoint viewing field to the display using a wireless signal.

8. The media device of claim 1, wherein the communication system is a cellular system such that the first media device is communicatively coupled to the second media device using wireless signals.

9. The media device of claim 1, wherein the communication system is a telephony system such that the first media device is communicatively coupled to the second media device using wireless signals.

10. The media device of claim 1, wherein the communication system is a hybrid communication system, and wherein a portion of the hybrid communication system employs one of a cellular system and a telephony system such that the first media device is communicatively coupled to the second media device using wireless signals.

11. The media device of claim 1, further comprising:

the display.

12. A method of sharing a viewing experience of a streaming free viewpoint format media content event among a plurality of users who are concurrently viewing a video portion of the streaming free viewpoint format media content event using a head mounted display (HMD), and who all are listening to a corresponding audio portion of the streaming free viewpoint format media content event, the method comprising:

receiving, at a first media device being used by a first user, the streaming free viewpoint format media content event;

receiving, at the first media device, first geometric orientation information that defines orientation of a first HMD with respect to a first portion of a viewing field of the streaming free viewpoint format media content event where the first user of the first HMD is currently looking at, determining, at the first media device, a first viewpoint location in the video portion of the streaming free viewpoint format media content event based upon the first geometric orientation information, wherein the first viewpoint location identifies a first point of interest in the presented video portion of the streaming free viewpoint format media content event where the first user of the first HMD is looking;

determining, at the first media device, a first viewpoint area for the first HMD based upon the first determined viewpoint location;

presenting the determined first viewpoint area on a first display;

receiving, at a second media device being used by a second user, the streaming free viewpoint format media content event, wherein the streaming free viewpoint format media content event is received at the second media device in synchronism with the streaming free viewpoint format media content event received at the first media device;

receiving, at the second media device, second geometric orientation information that defines orientation of a second HMD with respect to a second portion of the viewing field of the streaming free viewpoint format media content event where the second user of the second HMD is currently looking at, determining, at the second media device, a second viewpoint location in the same video portion of the streaming free viewpoint format media content event based upon the second geometric orientation information, wherein the second viewpoint location identifies a second point of interest in the presented stream of video information of the streaming free viewpoint format media content event where the second user of the second HMD is looking;

determining, at the second media device, a second viewpoint area for the second HMD based upon the second determined viewpoint location; and presenting the determined second viewpoint area on a second display.

13. The method of claim 12, wherein receiving the streaming free viewpoint format media content event at the first media device comprises:

receiving the streaming free viewpoint format media content event at the first media device in a first media content stream being communicated to the first media device via a communication system that the first media device is communicatively coupled to; and receiving the streaming free viewpoint format media content event at the second media device in a second media content stream being communicated to the second media device via the communication system that the second media device is communicatively coupled to.

14. The method of claim 13, wherein the communication system is a cellular system that communicates the first media content stream to the first media device using a first wireless signal, and wherein the communication system communicates the second media content stream to the second media device using a second wireless signal.

15. The method of claim 13, receiving a pause command initiated by the first user that operates the first media device to pauses presentation of the streaming free viewpoint format media content, wherein the first media device communicates the pause command to the second media device via the communication system that causes the second media device to also pause presentation of the streaming free viewpoint format media content to the second user.

16. The method of claim 13, receiving a rewind command initiated by the first user that operates the first media device to rewind presentation of the streaming free viewpoint format media content, wherein the first media device communicates the rewind command to the second media device via the communication system that causes the second media device to also rewind presentation of the streaming free viewpoint format media content.

17. The method of claim 13, communicating a first user's verbal comment made by the first user of the first media device to the second media device via the communication system, wherein the second user of the second media device hears the first user's verbal comment.

18. The method of claim 12, further comprising:

advancing, at the first media device, presentation of the streaming free viewpoint format media content event so that the streaming free viewpoint format media content event is synchronously presented by both the first media device and the second media device.

19. The method of claim 12, further comprising:

retarding, at the first media device, presentation of the streaming free viewpoint format media content so that the streaming free viewpoint format media content is synchronously presented by both the first media device and the second media device.

20. The method of claim 12, wherein the first media device comprises the first display.

* * * * *